July 16, 1963 R. L. ANGLE 3,097,382
EGG WASHER
Filed Sept. 6, 1960 3 Sheets-Sheet 1
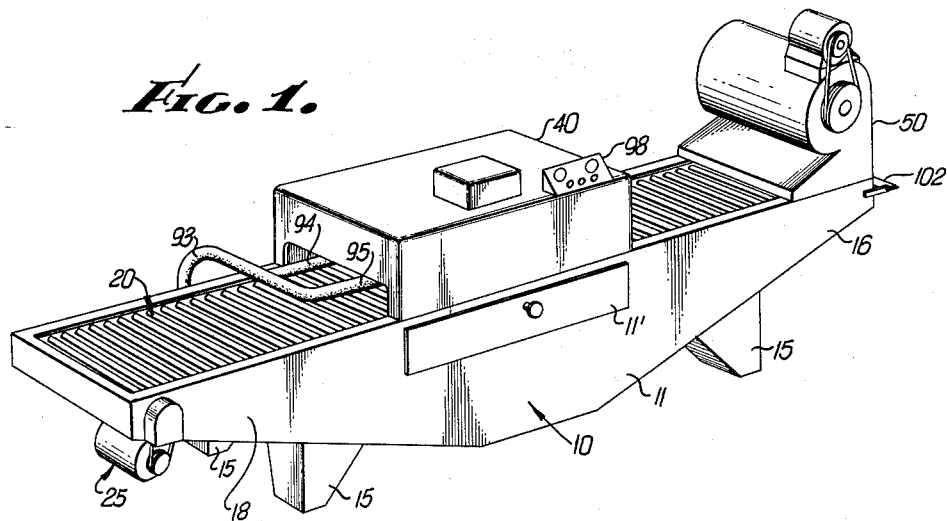
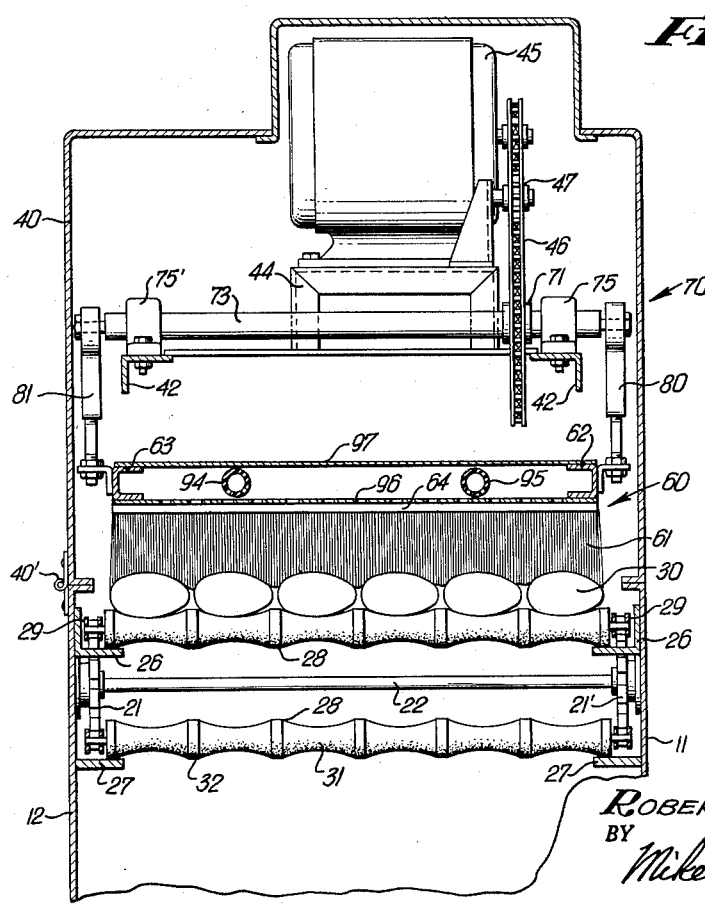
INVENTOR.
ROBERT L. ANGLE
BY
ATTORNEYS.

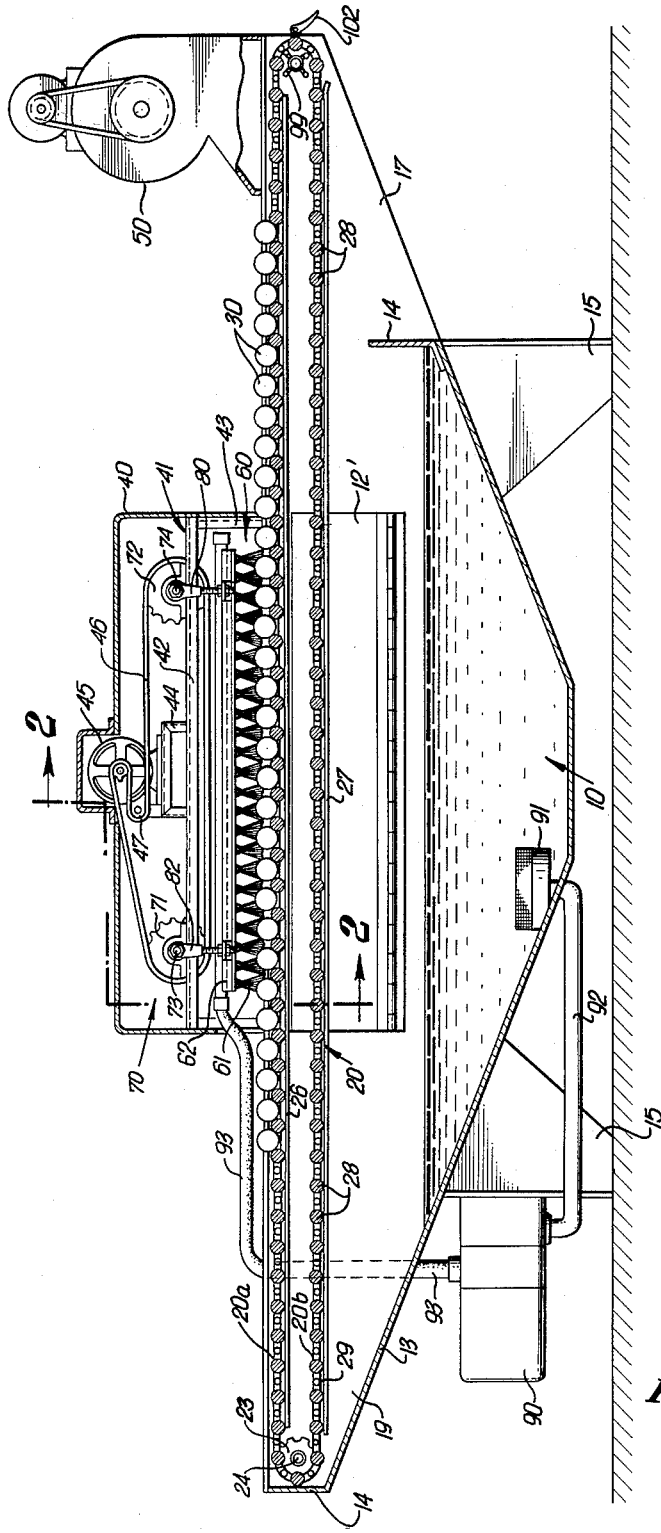

July 16, 1963 R. L. ANGLE 3,097,382
EGG WASHER

Filed Sept. 6, 1960 3 Sheets-Sheet 3

INVENTOR.
ROBERT L. ANGLE
BY
Miketta and Glenny
ATTORNEYS.

United States Patent Office 3,097,382
Patented July 16, 1963

3,097,382
EGG WASHER
Robert L. Angle, 6741 Miller St., Placentia, Calif.
Filed Sept. 6, 1960, Ser. No. 54,032
4 Claims. (Cl. 15—3.13)

This invention pertains to a machine capable of washing large numbers of eggs. The invention is particularly directed to a machine capable of subjecting large numbers of eggs to washing and scrubbing operations as well as drying of the eggs by the provision of novel brush means operating in a unique manner.

Many problems are encountered in commercially handling large numbers of eggs, some of the problems being due to the rather fragile character of the egg itself and also to the fact that the eggs must be washed, scrubbed, dried, graded as to size or weight, etc. without destruction. At certain times of the year the droppings and other foreign matter adhere very tenaciously to the eggs. When warm water is used during scrubbing and washing care must be taken not to overheat the eggs or precook them. Because of the quantity of droppings and adhering dirt, provision must be made whereby the washing solutions or water is maintained clean and all of the brushes and other portions of the equipment are made accessible and readily cleaned. When graders are employed, provision must be made whereby the eggs from the scrubbing and washing apparatus may be transferred to the automatic grader without destroying or impairing the accuracy of the grader. Inasmuch as many graders operate by weighing the eggs, the adjacent machinery must be free from vibration or such vibrations should not be transmitted to the graders. Inasmuch as many graders operate by employing conveyors which move only intermittently, whereas eggs pass through the washing and scrubbing apparatus continuously, means must be provided whereby perfect synchronization is attained between the two conveyors (washer and grader) so that the eggs are not scrambled and broken during transition from one apparatus to the other.

The present invention is directed to an arrangement of elements which solve all of the problems referred to hereinabove. Although continuous conveyors have been used for handling many articles, including eggs, the present invention employs a unique arrangement between a continuous, rotating, roll-type of conveyor and a brush means. Prior egg washers have employed horizontally reciprocating brushes (see Patents No. 1,542,347 and No. 2,301,931, for example) or pivoted brushes which were raised by the eggs passing therebeneath (as in Patent No. 2,371,867). In the present invention no reciprocating elements are employed and, as a result, the machine is substantially free from vibration and no vibrations of a dangerous type are transmitted to adjacent graders.

One of the distinctive characteristics of the present invention lies in the provision of brush means mounted above a rotating roll-type conveyor, the brush means presenting a multitude of downwardly directed fibers whose lower ends terminate in a virtually common horizontal plane. Means are provided for imparting a continuous, circular motion to said brush means and fiber ends in a vertical plane, such plane being parallel to the direction of advance of the conveyor. The circular motion of the brush means is in the same direction of rotation as the direction of rotation of the eggs rolling on the rollers, but at a materially greater angular velocity, thereby thoroughly scrubbing the eggs while they are being rotated by the conveyor and are moving beneath the brush means, and, in addition, facilitating such rotation. The apparatus of the present invention only employs brushes mounted above the eggs; a constant stream of water or cleansing solution is supplied to the brush means downwardly against the eggs. Droppings and other foreign matter are therefore washed away from the brushes and through the non-absorbent conveyor rolls into a collection and storage tank beneath the conveyor. The brushes are maintained in a clean and sanitary condition. Moreover, the construction of the apparatus is such that every portion of the device is readily accessible; the entire brush assembly may be removed from above the conveyor as a unit; the entire storage compartment for washing solution as well as the rolls of the conveyor are also readily accessible for adjustment, cleaning, replacement, etc.

Another aspect of the invention contemplates the provision of an apparatus for washing and scrubbing eggs which need not be mechanically connected to a grader conveyor. No mechanical vibrations are therefore transmitted to the grader to impair its accuracy and efficiency. The present invention provides a synchronizing system which insures a safe and rapid transmittal of eggs from a washing conveyor to a grader. Moreover, the invention includes means for effectively drying the eggs after they have been washed and scrubbed and before they are delivered to the grader. This is extremely important in that the grader conveyors are often provided with rollers which are absorptive and would quickly deteriorate in the event excessive moisture was present.

An object of the present invention, therefore, is to disclose and provide a machine for subjecting large numbers of eggs to a washing and scrubbing operation in a safe and efficient manner.

A further object of the invention is to disclose and provide a novel method of washing and scrubbing eggs, the method obviating the necessity of employing reciprocating elements or parts.

A still further object of the invention is to disclose and provide a machine capable of washing large numbers of eggs in a rapid and economical manner, the machine being so arranged that all working portions thereof may be readily inspected, cleaned and adjusted.

A still further object of the invention is to disclose and provide arrangements whereby the conveyors of an egg-washing machine and an egg grader may be synchronized without mechanical interconnection.

These and various other objects and advantages of the present invention will become apparent from the following more detailed description of exemplary forms of the present invention. In order of facilitate understanding, reference will be made to the appended drawings, in which:

FIG. 1 is a perspective view of an exemplary embodiment of an egg washer according to the invention;

FIG. 2 is an enlarged transverse sectional view of the egg washer of FIG. 1 along the plane II—II in FIG. 3;

FIG. 3 is a side elevation of the egg washer of FIG. 1 with portions cut away to disclose the interior thereof;

Figure 4:
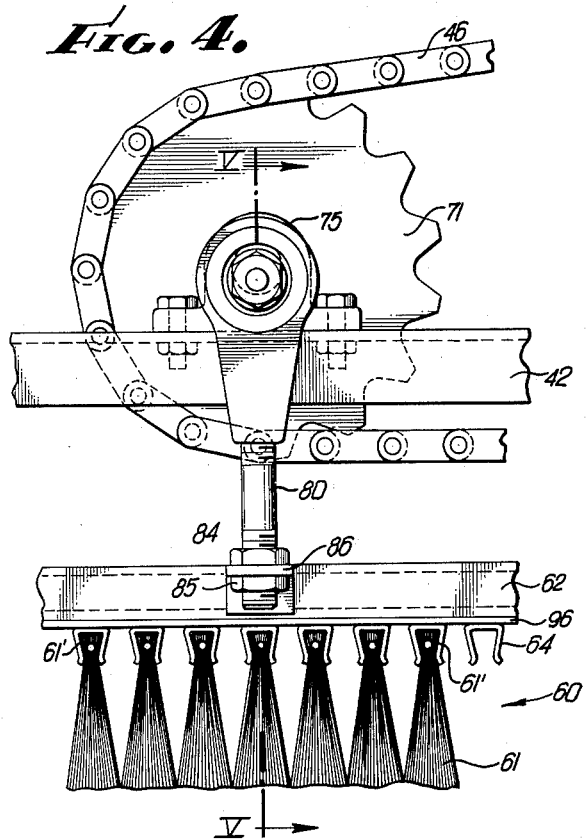
FIG. 4 is a detailed view of a portion of the egg washer of FIG. 3.

Referring first to FIGS. 1 and 3, the egg washer according to the invention may comprise a collection and storage tank or wash tank 10 which is supported on a base of legs 15 and is provided with a continuous roller-type conveyor 20. Driving means, indicated generally at 25, propel the conveyor 20, from left to right in FIGS. 1 and 3, carrying eggs to be washed beneath a brush assembly within the brush housing 40 where the eggs are cleaned and brushed with the aid of an aqueous-cleaning fluid. As conveyor 20 carries the eggs onward, they are rotated and pass beneath a blower 50 where hot air is blown over the cleaned eggs which are thereafter either collected for further processing or directly deposited on a grading machine of any desired type.

Wash tank 10 is provided with a generally parallel, spaced sides 11 and 12 which together with the sloping bottom 13 and end wall 14 define a container to receive, hold and collect droppings and other foreign matter adhering to the eggs and also to collect and store the aqueous cleaning fluid used to clean and wash the eggs. The droppings and other foreign matter may be readily removed from the collection or wash tank 10 through the hinged cleaning doors 11' and 12' which are provided on either side of the tank 10 in the side 11 and 12 respectively. A filter may be positioned in a lower portion of tank 10 to allow the aqueous cleaning fluid to be removed and recirculated for reuse in the egg washing operation as subsequently described herein.

The upper portions of the side 11 and 12 of wash tank 10 extend longitudinally in both directions from the middle portion of the wash tank 10 forming overhangs protruding beyond the base or legs 15. The extension portions 16 and 17 have the blower 50 positioned on and above them and are not provided with a closure or bottom, as the sloping bottom 13 closes the underside of extensions 18 and 19, so that the drying air, emitted by the blower 50, may pass freely over the eggs and down out of the washer. Blower 50 is preferably positioned to emit a drying air current in a direction opposite to the direction of travel of the eggs being washed, as shown in FIGS. 1 and 3.

The continuous roller-type conveyor 20 is mounted on the washer above the wash tank 10 by means of rotating sprocket wheels journalled in the overhanging extensions of the sides 11 and 12. As seen in FIGS. 2 and 3, the end of the conveyor 20 beneath the blower 50, is mounted on sprocket wheels 21 and 21' which are fixed on an axle 22, which in turn is journalled on the overhanging extensions 16 and 17. The other end of the conveyor 20, the left end in FIG. 3, is similarly mounted on sprocket wheels 23 and 23' fixed on an axle 24, which is journalled on the overhanging extensions 18 and 19 and is cooperatively associated with the driving means, indicated generally at 25. The driving means 25 may comprise an electric motor mounted beneath the overhang formed by extensions 18 and 19 and may be mechanically connected to the axle 24 by means of a chain drive, to drive the conveyor 20 in a clockwise rotation, as shown in FIG. 3, moving the upper lay 20a from left to right.

The upper and lower lays 20a and 20b of the conveyor 20 are supported intermediately of the end sprocket wheel supports by inwardly extending track ways 26 and 27, as seen in FIG. 2. The upper lay 26a rolls upon track way 26 while the lower lay 20b rolls on track way 27.

Conveyor 20 is comprised of a plurality of spaced parallel rollers 28 aligned transversely to the length of the washer tank 10 and to the direction of their travel along the washer. Each of the rollers 28 rolls alternately on the track ways 26 and 27 and has its ends mounted in the conveyor chain or belt 29 which positions each roller relative to the others, spaces the rollers the same spacing as filler flats in which eggs are gathered, facilitating loading the machine with a vacuum lifter, and drives all of the rollers 28 along the track ways 26 and 27. Each of the rollers 28 has a varying diameter from one end of the roller to the other, the diameter being successively and alternately larger and smaller. As best shown in FIG. 2, the eggs 30 are readily spaced, positioned and rollingly advanced by the rollers 28. Such movement is facilitated by providing the rollers 28 with the smaller diametered portions 31 which generally conform to the outer configuration of an egg, though they are each symmetrical about a plane bisecting each portion's axis. The larger diametered portions 32 aid in separating and spacing the eggs 30 relative to each other as they are being rolled along the conveyor 20. As the rollers 28 roll along the track ways 26 and 27, the eggs 30 are in turn rolled, as well as advanced, due to the rotation and advancement of the rollers 28 so that their entire surface area is exposed to the brushing and cleaning operation which occurs within the brush housing 40.

Each roller is provided with a yielding but substantially water-impervious surface. Such surface may be provided by fitting a rubber tube or resilient, expandable sleeve over a preferably cast aluminum roller wherein the unexpanded intenal diameter of the rubber tube is smaller than the smallest outer diameter of the cast aluminum roller. A method of applying the rubber tube to the roller is to first place the rubber tube into a steel tube jig having an internal diameter larger than the rubber tube's external or outside diameter and sealing the ends of the rubber tube to the larger ends of the jig thereby expanding the end portions of the rubber tube. A cavity is therefore formed between the outside diameter of the rubber tube and the internal diameter of the steel tube jig. By evacuating the air from this cavity the rubber tube is made to uniformly expand to conform to the internal diameter of the steel tube jig. The varying diameter roller may then be easily inserted into the expanded rubber tube and, when the vacuum is relieved between the jig and rubber tube, the rubber tube will contract and assume a shape conforming to the shape of the varying diameter cast aluminum roller presenting a yielding, substantially water-impervious surface.

Brush housing 40 and the brush assembly are removably positioned above the conveyor 20 and wash tank 10 supported upon the sides 11 and 12 therefor, ultimately, on the base of legs 15. Housing 40 is preferably removable to allow ease of access in cleaning the brush assembly contained therein as well as the means for supplying aqueous fluid from the wash tank to the brush assembly. Housing 40 may be hinged to one of the sides of the washer, as by hinge 40' on side 12 as shown in FIG. 2, to allow such access to the assembly therein. Eggs may be moved on the conveyor with the brush assembly raised when they do not need to be washed.

The brush assembly, indicated generally at 60 within the housing 40, is preferably constructed of brush means comprising a plurality of individual brush elements 61, and a rigid frame comprised of a pair of opposed, spaced longitudinal side members 62 and 63 interconnected by a plurality of transversely oriented clamp members 64 whose ends are fixed to the underside of the longitudinal side members 62 and 63. The individual brush elements 61 are individually mounted or clamped onto the rigid frame by means of the transversely extending, spaced clamp members 64, as best shown in FIG. 4, to form a parallel, spaced array of brushes oriented transversely to the washer and the direction of travel of the conveyor 20. Brush elements 61 are provided with downwardly extending flexible fibers or bristle filaments, preferably made of nylon bristles have a diameter of about .010 inch and a length of about 2 inches. The bristles are held together by a strip holder 61' preferably made of aluminum strips. The filaments or fibers are positioned in the clamp members 64 to present their lower free ends in a plane parallel to the top of the rollers of conveyor 20 and spaced therefrom. The brush elements are spaced far enough above the conveyor 20 to allow the eggs 30 to pass therebetween during a cleaning operation and yet allow the brush fibers to contact the eggs in the washing operation as shown in FIGS. 2 and 3.

The brush means may also be provided in the form of a unitary or single brush having a length coextensive with the length of an individual roller 28 and width of any amount more than two rollers, and preferably of about the width of 20 successive rollers.

Means are also provided within the brush housing 40 for imparting a circular motion to the brush assembly, indicated generally at 60, in a vertical plane parallel to the direction of travel of the conveyor 20. Such means may include driving means in the form of an electric motor 45 which is mounted within the housing 40 on a frame 41 having side members 42, vertical corner members 43 and a central platform portion 44 which receives and supports the motor. Motor 45 is adapted by means of a chain drive to drive eccentric means, indicated generally at 70 which in turn act upon the brush assembly through two pairs of parallel, spaced yoke straps 80 and 81, 82 and 83.

Figure 5:
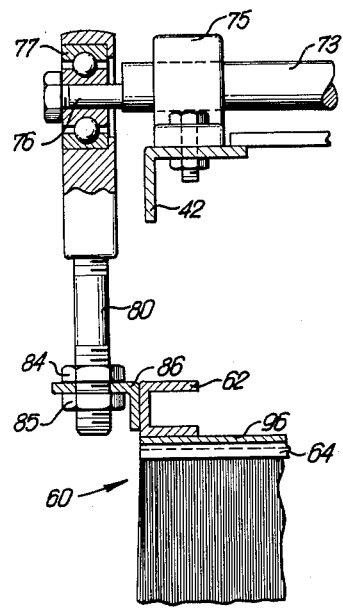
FIG. 5 is a side view of the detail of FIG. 4.

Referring to FIGS. 4 and 5, the yoke straps are rigidly connected to the longitudinal side members of the frame assembly 60, as yoke strap 80 is therein shown bolted to longitudinal side member 62. The effective length of the yoke strap may be adjusted by adjusting the position of the bolts 84 and 85 on the yoke strap 80 before locking them on each other and the connecting angle iron 86 of the brush assembly. The other yoke straps 81, 82 and 83 are similarly connected to the brush assembly providing four points of support for the assembly, though only one pair of yoke straps may be employed. The yoke straps are connected to eccentric means to give the brush assembly a circular motion in the vertical plane as opposed to only a reciprocating motion in either a horizontal or vertical plane.

Eccentric means, indicated generally at 70, are provided to operate in association with the driving means or motor 45 and the brush assembly, indicated generally at 60, through the yoke straps 80, 81, 82 and 83. The eccentric means in the exemplary embodiment are comprised of two crank shafts 73 and 74, which are respectively driven by the sprocket wheels 71 and 72 and which operate together in phase to provide eccentric motion in phase to the four yoke straps 80, 81, 82 and 83 in unison. As shown in FIG. 3, the two sprocket wheels 71 and 72 are driven together in the same direction and speed by the motor 45 by way of the driving chain 46. An idler gear 47 may be provided to allow adjustment of the tension in the chain and provide a greater arc of contact between the driver chain 46 and the drive shaft of motor 45. Each crank shaft 73 and 74 is journalled at either end upon the frame 41 by means of journal bearings, as shaft 73 is shown journalled on journal bearing 75 in FIG. 5. The journal bearing may be mechanically fastened to frame 41, as by a nut and bolt connection as shown in FIGS. 4 and 5. Each end of the crank shafts 73 and 74 is provided with an offset crank element which engages in respective yoke straps by means of radial ball bearings, as crank element 76 engages yoke strap 80 by means of radial ball bearing 77 in FIG. 5. The crank elements may be offset in crank shaft axis about .25 inch, i.e., a .25 inch throw, producing an overall vertical travel of each yoke strap of about ½ inch, but a larger travel may be used.

The brush assembly is given a circular motion, in the same direction of rotation as that of the eggs 30 rotating on the rollers 28, in a vertical plane parallel to the direction of travel of the conveyor 20. The cyclic motion of the brush fibers of each brush element 61 is comprised first of a downward arcuate motion over and around the eggs 30, preferably far enough to bring the ends of the fibers of the brush elements below the midplanes of eggs 30, the resultant brushing effect aiding the rotation of the eggs 30; then a bottom arcuate path wherein the fibers slidably brush across the surfaces of the eggs 30 in opposed relative motion; then an upwardly directed arcuate path bringing the brush elements toward a raised position at the top of the cycle; and then a top arcuate path where the fibers are moving generally in the same direction as the top surfaces of the eggs 30 are traveling, the cycle thereafter repeating itself. The brush elements are preferably in constant contact with the eggs 30 but removing the elements from contact with the eggs 30 during the top arcuate path of the cycle is permissible. Rotation of the eggs 30 may be aided by the motion of the fibers during the top arcuate path when the brush assembly 60 is adjusted to bring fibers of the brush elements 61 in contact therewith during said top arcuate path. The speed of rotation for the crank shafts 73 and 74 should be materially greater than that of the rollers 28, preferably of about 400 revolutions per minute, or at least 4 times the r.p.m. of the rollers 28, producing a circular movement of the brush assembly of similar cycles per minute. The eggs 30 are thereby caused to spin considerably faster than the speed of rotation normally imparted to them by the rotation of the rollers 28. Such spinning motion greatly aids in removing tightly adhering droppings, etc. on the eggs being washed.

Means for supplying aqueous fluid from the wash tank 10 are also provided so that a cleaning fluid may be employed along with the brushing effect of the brush means to clean and wash the eggs 30. Such means include pump means 90 which draws the aqueous fluid from the storage or wash tank 10 through the filter 91 and filter connection tube 92 and thereafter propells it through the supply tube 93 to a point above the wash tank 10 between the side members 11 and 12. As shown in FIG. 1, supply tube 93 splits off into 2 delivery tubes 94 and 95 which deliver the aqueous cleaning fluid directly over the brush assembly, indicated generally in 60. As shown in FIG. 2, the delivery tubes 94 and 95 supply the aqueous cleaning fluid into a cavity formed by a perforated plate 96, positioned on the lower inwardly directed flanges of the longitudinal side members 62 and 63, and a top sheet plate 97, positioned on the top flange of longitudinal side members 62 and 63. Delivery tubes 94 and 95 may be made of rubber hose or the like to allow flexure of the tubes as the brush assembly is moving in its cyclic, rotational, cleaning motion. The aqueous fluid is allowed to pass downward through the perforated plate 96 onto the roots of the brush fibers or filaments as well as generally all about them, supplying a continuous downwardly directed flow of fluid which continuously cleans the brush filaments or elements 61 as well as cooperates with the brush elements in the cleaning of eggs 30.

The aqueous fluid supplied to the brush assembly may be heated to aid the cleaning operation by providing an electrical heating coil of a conventional type within the wash tank 10 where the aqueous fluid may be circulated about it. Such electrical heating coil should be provided with a thermostatic control, also of conventional type and indicated generally at 98 on a control panel on housing 40, so that the coil may be easily activated and deactivated in response to its temperature change to maintain the aqueous fluid temperature at or below a temperature of about 105° F. to prevent pre-cooking of the eggs. Similarly, conventional circuit breaking switch means may be employed to automatically shut off the pump 90 when the conveyor 20 is stopped so that the flow of aqueous cleaning fluid will also be stopped. The continuous flow of fluid over the eggs stopped under the brush assembly when the conveyor 20 stops even at a temperature of about 100° F., may cause some pre-cooking effects in the eggs if the flow of the fluid is allowed to continue.

The egg washer, according to the invention may be adapted to be used with an egg grading machine of any desired or conventional construction. Typical grading machines normally employ conveyor means having intermittent motion, the conveyor being stopped during weighing operations do determine the grade of the various eggs by weight. Means may be provided therefore to synchronize the normally continuous motion of the egg washer machine conveyor with the intermittent motion of a grader machine conveyor so that the washed and cleaned eggs delivered by the washer are automatically and synchronously received by the grader between a pair of rollers thereon without breaking or scrambling any of the eggs. An exemplary means of synchronizing the motion of the washer to that of the grader conveyor is diagrammatically represented in FIG. 6. The washer conveyor 20 is shown to the left with the rollers 28 moving clockwise about the end of the conveyor. Eggs 30 are shown being delivered to that end where a paddle wheel-like four armed ejector 99 contacts and lifts each of the eggs 30 from between the rollers 28 as they reach the end of the conveyor. The washer conveyor driving means 25 is shown connected to an electrical power source by the power lines 100 and 101. A microswitch 110, in line 101, is normally closed completing that circuit to activate the driver means 25 to drive conveyor 20 in a normally continuous motion supplying eggs to that end of the washer.

Figure 6:
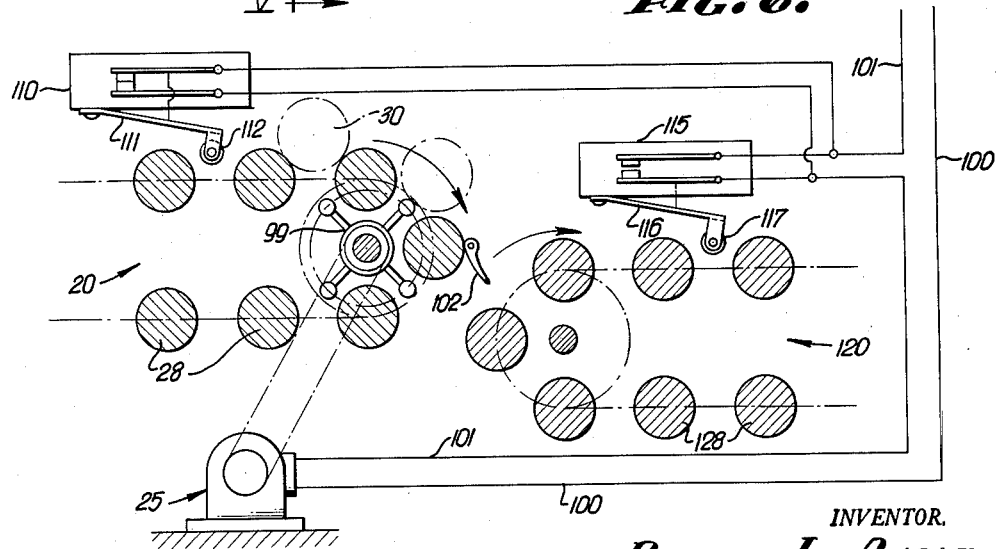
FIG. 6 is a diagrammatic representation of the discharged end of a egg washing machine conveyor and the receiving end of a grading machine conveyor and means to synchronize their relative motion.

The end of a typical grader conveyor 120 is shown at the right in FIG. 6 having spaced, transversely aligned rollers 128 moving clockwise about that end which receive the eggs 30 from the washer. The grader conveyor 120 is preferably positioned lower than the washer conveyor 20 and in generally close proximity thereto, so that the eggs 30 may gravitate from the washer to the grader, rolling upon a resilient or flexible transfer plate 102 which is hinged upon the washer overhanging extensions 16 and 17 of the washer sides 11 and 12. Transfer plate 102 extends outwardly from the washer and is adapted to be contacted by a grader conveyor roller 128 as it comes up to receive an egg 30; the plate 102 providing an inclined plane upon which an egg 30 may roll from the washer to the grader.

A microswitch 115 on the grader is normally opened and is placed in the line 101, as is the microswitch 110 of the washer in line 101. Microswitch 110 is normally closed. A spring arm 111 with a roller 112 on its free end is adapted to contact successive rollers 28 of the washer conveyor 20 opening microswitch 110 and breaking that circuit by opening line 101 to the drive means 25 during the interim in which a roller is positioned under the arm roller 112. A similar spring arm 116 on microswitch 115 has a roller 117 on its free end and is adapted to engage each roller of rollers 128 successively as they pass below it. The motion of a roller 128 under the spring arm 116 causes a closure of that normally opened microswitch 115 completing the circuit to the drive means 125 during the interim when a roller 128 is beneath the spring arm roller 117. It can be seen, therefore, that the rollers of the two conveyors may be made to synchronously move into position together to transfer an egg from the washer to the grader since during the time a washer roller 128 passes under the arm 111 the microswitch 110 is open breaking its normally closed circuit but at the same time a synchronized grader roller 128 completes the circuit by closing the microswitch 115 by way of the arm 116. The normally continuous motion of the egg washer may be momentarily interrupted by one of the rollers 28 opening microswitch 110 if a corresponding roller 128 of the grader is not synchronously aligned and closing the microswitch 115 at the same time. The egg washer conveyor will thus stop and wait for the intermittently moving conveyor of the grader to move one of its rollers 128 into position to complete the circuit, become synchronized with the rollers 28 of the conveyor 120, and thereby facilitate the transfer of washed eggs from the washer conveyor to the grader conveyor. The egg grader conveyor may be operated at a linear speed higher than that of the egg washer conveyor so that the average speed of the intermittently driven grader conveyor will approximate that of the generally continuously driven egg washer conveyor. The egg washer conveyor may therefore require only slight adjustments in its otherwise continuous motion to be synchronized with the egg grader conveyor.

An egg washer, according to my invention, may therefore be employed with most any separate conventional egg grading machine using an intermittently moving conveyor, without transferring undue vibrations from the washer to the grader which might disturb the weighing operations in the grader. In addition, the embodiment described herein allows the eggs to be washed, cleaned and thoroughly dried before being delivered to the grader. The novel circular rotational movement of the brush assembly and the means for supplying aqueous cleaning fluid to the assembly so that it flows downwardly over the brush means and eggs, allows the washer to effectively clean and wash large quantities of eggs rapidly while in effect cleaning itself. Further removal of the droppings and other foreign matter collected in the wash tank 10 and filtered out of the heated and recirculated cleaning fluid is facilitated by the provision of the hinged cleaning doors 11' and 12' as previously noted. Furthermore, the entire brush housing 40 and brush assembly contained therein may be removed or swung off of the washer by means of the hinge 40' to allow easy access to the central area of the conveyor 20 and to expose the brush means of the brush assembly for replacement or adjustment of the elements therein when required.

The above described embodiment of an egg washer according to my invention is exemplary only and it should be understood that other modifications, embodiments, adaptations and configurations of my egg washer may be employed within the scope of my invention as described by the following claims.

I claim:

1. In a machine for subjecting large numbers of eggs to a washing and scrubbing operation having an egg washing conveyor normally in continuous motion when the machine is in operation and wherein said machine is employed in conjunction with an egg grading machine having an intermittently moving egg receiving conveyor, the provision of: a wash tank to collect droppings and other foreign matter washed from eggs and to store aqueous cleaning fluid, said tank being supported on base means and having extension portions overhanging such base; a continuous, rotating, roll-type egg washing conveyor having its ends mounted on said overhanging extensions and adapted to advance and rotate eggs above said tank, said conveyor having a plurality of spaced, transversely-extending conveyor rollers, each roller being provided with alternately larger and smaller diameter sections; driving means operably connected to said egg washing conveyor; a brush housing removably positioned on said base above said tank and conveyor; a brush assembly mounted in said housing and comprising a rigid frame having longitudinal side members and a brush means attached to said frame, said brush means comprising a plurality of brush elements carrying downwardly extending flexible fibers, the ends of the fibers lying in a virtual plane parallel to the top of the roller conveyor but spaced therefrom; means carried by the housing for imparting to the brush assembly a circular motion in a vertical plane parallel to the direction of travel of said conveyor, said means including a pair of spaced parallel yoke straps rigidly connected to each longitudinal side members of the frame of said brush assembly; eccentric means carried by the housing and operably connected to said yoke straps; motor and drive means on said housing for driving such eccentrics in phase in the same direction and speed; and means for synchronizing the movement of said roll-type egg washing conveyor with an intermittently moving roll-type egg receiving conveyor of an egg-grading machine, said egg receiving conveyor having a plurality of parallel spaced rollers disposed below and proximate to an egg discharge end of said roller-type conveyor to receive washed and scrubbed eggs as they leave said end, said synchronizing means including a microswitch adapted to be responsive to the movement of successive rollers of said egg washing conveyor relative to said microswitch to alternately energize and de-energize said driving means operably connected to said egg washing conveyor.

2. In a machine as stated in claim 1, the provision of: means for transferring eggs from said egg discharge end of said egg washing conveyor to said egg receiving conveyor without breaking or scrambling said eggs, said means including ejector means associated with said egg discharge end of said egg washing conveyor to move said egg outwardly from said egg washing conveyor rollers and a transfer plate operably hinged on said wash tank at said egg discharge end of said egg washing conveyor normally describing a plane inclined from said egg washing conveyor to said egg receiving conveyor, said transfer plate being movable arcuately about said egg washing end in response to motion of said rollers of said egg receiving conveyor to facilitate rolling said eggs from said egg washing conveyors to said egg receiving conveyor while said egg receiving conveyor is in motion.

3. In a machine for subjecting large numbers of eggs to a washing and scrubbing operation, the provision of: a wash tank having sides and a sloping bottom, the upper portion of said sides extending longitudinally to form overhanging extensions, said tank and extensions being provided with supports to form a base; inwardly extending trackways carried by the upper portion of the sides of said base to rollably support upper and lower lays of a continuous roller conveyor above said tank; a continuous roller conveyor having its ends mounted on said overhanging extensions, said conveyor having a plurality of spaced, transversely extending rollers adapted to roll on said trackways, each roller being provided with alternately larger and smaller diameter sections, the rollers having a yielding but substantially water-impervious surface; driving means carried beneath one of said overhangs and operably connected to the conveyor for driving the same; a brush housing removably positioned on said base above said tank and conveyor; a brush assembly mounted in said housing and comprising a rigid frame having longitudinal side members and a brush means attached to said frame, said brush means comprising a plurality of brush elements carrying downwardly extending flexible fibers, the ends of the fibers lying in a virtual plane parallel to the top of the roller conveyor but spaced therefrom; means for supplying aqueous fluid from the wash tank to between side members and above the brush means of said brush assembly; pump means for supplying fluid from said tank to above the brush means of the brush assembly; means carried by the housing for imparting to said brush assembly a circular motion in a vertical plane parallel to the direction of travel of said conveyor, said means including a pair of spaced, parallel yoke straps rigidly connected to each longitudinal side member of the frame of said brush assembly, eccentric means carried by the housing and operably connected to said yoke straps; motor and drive means on said housing for driving said eccentrics in phase in the same direction and speed and means for adjusting the effective length of the yoke strap connections to said brush assembly; a blower carried above the conveyor on the overhang at the discharge end of said conveyor for subjecting eggs on said conveyor to a current of air counter to the direction of movement of the conveyor; a thermostatically controlled means for heating aqueous fluid in the wash tank; and means for de-energizing the pump means when the roller conveyor drive means is stopped.

4. An egg washing machine comprising: a continuous, rotating, roll-type egg washing conveyor for advancing and rotating eggs in spaced relation, said egg washing conveyor having a plurality of spaced transversely extending rollers; brush means mounted above said egg washing conveyor, said brush means presenting a multitude of downwardly directed fibers whose lower ends terminate in a virtually common, horizontal plane; means for imparting a continuous circular motion to said brush means and fiber ends in a vertical plane parallel to the direction of advance of said conveyor, the circular motion of said brush means being in the same direction as the direction of rotation of the eggs on the conveyor but at a materially greater angular velocity; means for continuously driving the egg washing conveyor; an intermittently driven egg grader conveyor adapted to receive eggs from the egg washing conveyor; and means including a circuit interconnecting said driving means for said egg washing conveyor and said egg grader conveyor, said circuit including stationary switches operated by rollers of each of said conveyors for stopping said egg washing conveyor when said egg grading conveyor is not in position to safely receive eggs from said egg washer conveyor without interrupting the intermittent movement of the egg grading conveyor.

References Cited in the file of this patent

UNITED STATES PATENTS

| 633,152 | Perry | Sept. 19, 1899 |
|---|---|---|
| 1,074,940 | Freer | Oct. 7, 1913 |
| 1,649,080 | Ross | Nov. 15, 1927 |
| 1,776,784 | Cramer | Sept. 30, 1930 |
| 1,991,324 | Keech | Feb. 12, 1935 |
| 2,080,198 | Brandenburg | May 11, 1937 |
| 2,273,020 | Chater | Feb. 17, 1942 |
| 2,518,799 | Leonard | Aug. 15, 1950 |
| 2,635,266 | Hutchinson | Apr. 21, 1953 |
| 2,979,746 | Willsey | Apr. 18, 1961 |

FOREIGN PATENTS

| 48,469 | Austria | June 10, 1911 |